(12) United States Patent
Alexandrov et al.

(10) Patent No.: US 8,732,242 B2
(45) Date of Patent: *May 20, 2014

(54) METHODS AND SYSTEMS FOR BANDWIDTH ADAPTIVE N-TO-N COMMUNICATION IN A DISTRIBUTED SYSTEM

(75) Inventors: Albert Alexandrov, Goleta, CA (US); Rafael Saavedra, Santa Barbara, CA (US); Robert Chalmers, Santa Barbara, CA (US); Kavitha Srinivasan, Goleta, CA (US)

(73) Assignee: Citrix Online, LLC, Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,985

(22) Filed: Feb. 9, 2012

(65) Prior Publication Data
US 2012/0143955 A1    Jun. 7, 2012

Related U.S. Application Data

(63) Continuation of application No. 11/381,702, filed on May 4, 2006, now Pat. No. 8,140,618.

(51) Int. Cl.
*G06F 15/16* (2006.01)

(52) U.S. Cl.
USPC ............................ 709/204; 709/206; 709/246

(58) Field of Classification Search
USPC .................. 709/204–206, 246–247
See application file for complete search history.

(56) References Cited

U.S. PATENT DOCUMENTS

| | | | |
|---|---|---|---|
| 4,013,828 A | 3/1977 | Judice | |
| 4,736,369 A | 4/1988 | Barzilai et al. | |
| 5,031,089 A | 7/1991 | Liu et al. | |
| 5,210,753 A | 5/1993 | Natarajan | |
| 5,541,927 A | 7/1996 | Kristol et al. | |
| 5,553,083 A | 9/1996 | Miller | |
| 5,564,016 A | 10/1996 | Korenshtein | |
| 5,727,002 A | 3/1998 | Miller | |
| 5,751,958 A * | 5/1998 | Zweben et al. | 709/204 |
| 5,754,774 A * | 5/1998 | Bittinger et al. | 709/203 |
| 5,764,235 A | 6/1998 | Hunt et al. | |
| 5,771,383 A | 6/1998 | Magee et al. | |
| 5,812,792 A | 9/1998 | Haddock et al. | |
| 5,826,025 A | 10/1998 | Gramlich | |
| 5,845,265 A | 12/1998 | Woolston | |
| 5,892,905 A * | 4/1999 | Brandt et al. | 726/11 |

(Continued)

FOREIGN PATENT DOCUMENTS

| | | |
|---|---|---|
| WO | WO 03/036499 | 5/2003 |
| WO | WO 2005/107220 | 11/2005 |

OTHER PUBLICATIONS

U.S. Appl. No. 09/523,315, Mar. 10, 2000, Salesky.
U.S. Appl. No. 60/014,242, Mar. 26, 1996, Salesky.

(Continued)

*Primary Examiner* — Joseph E Avellino
*Assistant Examiner* — James Baron
(74) *Attorney, Agent, or Firm* — McDermott Will & Emery LLP

(57) ABSTRACT

Methods and systems for bandwidth adaptive computing device to computing device communication are described. Bandwidth adaptive communication includes receiving a communication from a first participant, storing the payload data of the communication in a channel memory element associated with the first participant, and transmitting the payload data to a second participant.

11 Claims, 9 Drawing Sheets

(56) References Cited

U.S. PATENT DOCUMENTS

| | | | |
|---|---|---|---|
| 5,900,018 A | 5/1999 | Lynch | |
| 5,918,248 A | 6/1999 | Newell et al. | |
| 5,956,027 A | 9/1999 | Krishnamurthy | |
| 6,018,766 A | 1/2000 | Samuel et al. | |
| 6,081,829 A | 6/2000 | Sidana | |
| 6,167,432 A | 12/2000 | Jiang | |
| 6,175,571 B1 | 1/2001 | Haddock et al. | |
| 6,226,617 B1 | 5/2001 | Suzuki et al. | |
| 6,226,618 B1 | 5/2001 | Downs et al. | |
| 6,246,758 B1 | 6/2001 | Low | |
| 6,249,291 B1 | 6/2001 | Popp et al. | |
| 6,289,382 B1 | 9/2001 | Bowman-Amuah | |
| 6,327,276 B1 | 12/2001 | Robert et al. | |
| 6,332,163 B1 | 12/2001 | Bowman-Amuah | |
| 6,339,832 B1 | 1/2002 | Bowman-Amuah | |
| 6,343,313 B1 | 1/2002 | Salesky et al. | |
| 6,400,996 B1 | 6/2002 | Hoffberg et al. | |
| 6,415,329 B1 | 7/2002 | Gelman et al. | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,502,213 B1 | 12/2002 | Bowman-Amuah | |
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,571,282 B1 | 5/2003 | Bowman-Amuah | |
| 6,578,068 B1 | 6/2003 | Bowman-Amuah | |
| 6,584,569 B2 | 6/2003 | Reshef et al. | |
| 6,601,192 B1 | 7/2003 | Bowman-Amuah | |
| 6,601,234 B1 | 7/2003 | Bowman-Amuah | |
| 6,606,660 B1 | 8/2003 | Bowman-Amuah | |
| 6,615,199 B1 | 9/2003 | Bowman-Amuah | |
| 6,615,253 B1 | 9/2003 | Bowman-Amuah | |
| 6,636,242 B2 | 10/2003 | Bowman-Amuah | |
| 6,640,145 B2 | 10/2003 | Hoffberg et al. | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,658,464 B2 | 12/2003 | Reisman | |
| 6,715,145 B1 | 3/2004 | Bowman-Amuah | |
| 6,742,015 B1 | 5/2004 | Bowman-Amuah | |
| 6,842,906 B1 | 1/2005 | Bowman-Amuah | |
| 6,850,252 B1 | 2/2005 | Hoffberg | |
| 6,918,113 B2 | 7/2005 | Patel et al. | |
| 6,959,320 B2 | 10/2005 | Shah et al. | |
| 7,006,881 B1 | 2/2006 | Hoffberg et al. | |
| 7,013,327 B1 | 3/2006 | Hickman et al. | |
| 7,023,979 B1 | 4/2006 | Wu et al. | |
| 7,111,298 B1 | 9/2006 | Michael et al. | |
| 7,113,934 B2 | 9/2006 | Levesque et al. | |
| 7,149,855 B2 * | 12/2006 | Chen et al. | 711/154 |
| 7,197,535 B2 | 3/2007 | Salesky et al. | |
| 7,200,804 B1 | 4/2007 | Khavari et al. | |
| 7,310,675 B2 | 12/2007 | Salesky et al. | |
| 7,369,515 B2 | 5/2008 | Salesky et al. | |
| 7,418,476 B2 | 8/2008 | Salesky et al. | |
| 7,426,191 B2 | 9/2008 | Salesky et al. | |
| 7,484,208 B1 | 1/2009 | Nelson | |
| 7,526,469 B2 * | 4/2009 | Narita et al. | 1/1 |
| 7,593,987 B2 | 9/2009 | Salesky et al. | |
| 7,627,663 B2 | 12/2009 | Salesky et al. | |
| 7,715,331 B2 | 5/2010 | Salesky et al. | |
| 7,716,344 B2 | 5/2010 | Salesky et al. | |
| 7,769,961 B2 | 8/2010 | Kottomtharayil et al. | |
| 7,813,304 B2 | 10/2010 | Salesky et al. | |
| 7,822,859 B2 | 10/2010 | Salesky et al. | |
| 7,836,163 B2 | 11/2010 | Salesky et al. | |
| 7,877,489 B2 | 1/2011 | Salesky et al. | |
| 7,934,002 B2 | 4/2011 | Salesky et al. | |
| 2001/0003193 A1 | 6/2001 | Woodring et al. | |
| 2002/0049608 A1 | 4/2002 | Hartsell et al. | |
| 2002/0049841 A1 | 4/2002 | Johnson et al. | |
| 2002/0059274 A1 | 5/2002 | Hartsell et al. | |
| 2002/0065864 A1 | 5/2002 | Hartsell et al. | |
| 2002/0073059 A1 | 6/2002 | Foster et al. | |
| 2002/0073238 A1 | 6/2002 | Doron | |
| 2002/0078142 A1 * | 6/2002 | Moore et al. | 709/203 |
| 2002/0083183 A1 | 6/2002 | Pujare et al. | |
| 2002/0120607 A1 * | 8/2002 | Price et al. | 707/1 |
| 2002/0133675 A1 | 9/2002 | Hirayama | |
| 2002/0174227 A1 | 11/2002 | Hartsell et al. | |
| 2003/0009538 A1 | 1/2003 | Shah et al. | |
| 2003/0140159 A1 | 7/2003 | Campbell | |
| 2003/0172372 A1 * | 9/2003 | Crisan et al. | 717/170 |
| 2004/0031058 A1 | 2/2004 | Reisman | |
| 2004/0098748 A1 | 5/2004 | Bo et al. | |
| 2004/0103147 A1 | 5/2004 | Flesher et al. | |
| 2004/0111639 A1 | 6/2004 | Schwartz et al. | |
| 2004/0151018 A1 * | 8/2004 | Chen et al. | 365/145 |
| 2004/0151177 A1 | 8/2004 | Burton et al. | |
| 2005/0033824 A1 * | 2/2005 | Takahashi et al. | 709/217 |
| 2005/0182909 A1 * | 8/2005 | Volp et al. | 711/152 |
| 2006/0004765 A1 * | 1/2006 | Anderson et al. | 707/10 |
| 2006/0064716 A1 | 3/2006 | Sull et al. | |
| 2006/0136677 A1 | 6/2006 | Fuhs et al. | |
| 2006/0161671 A1 | 7/2006 | Ryman et al. | |
| 2007/0112880 A1 * | 5/2007 | Yang et al. | 707/201 |
| 2007/0233691 A1 | 10/2007 | Chaushev | |
| 2007/0233891 A1 | 10/2007 | Luby et al. | |
| 2009/0019248 A1 | 1/2009 | Jeong et al. | |
| 2009/0125904 A1 | 5/2009 | Nelson | |
| 2010/0306674 A1 | 12/2010 | Salesky et al. | |

OTHER PUBLICATIONS

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Waha et al., "XTV: A Framework for Sharing X Window Clients in Remote Synchronous Collaboration," IEEE Conference, pp. 1-15 (1991).

Bolot et al., "Scalable Feedback Control for Multicast Video Distribution in the Internet," SIGCOMM 94, London England, pp. 58-67 (1994).

Campbell et al., "Meeting End-to-End QoS Challenges for Scalable Flows in Heterogeneous Multimedia Environments." In *Proceedings of the IFIP Sixth International Conference on High Performance Networking VIR*. Puigjaner, Ed. IFIP Conference Proceedings, vol. 29. Chapman & Hall ltd., London, UK, 1995 pp. 101-115.

Chen et al., "Real Time Video and Audio in the World Wide Web", 1995.

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pages pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

(56) References Cited

OTHER PUBLICATIONS

Examination Report for Australian Patent Application No. 2007248550 dated Apr. 12, 2010, 2 pages.
International Search Report for Corresponding PCT Application No. PCT/US2007/010729, Mailed Nov. 14, 2007, 4 pages.
Maly et al., "Mosaic+XTV=CoReview," Computer Networks and ISDN Systems, pp. 1-19 1995.
McCanne et al., "Receiver-Driven Layered Multicast," ACM SIGCOMM, pp. 1-14 (1996).
Sattler, "Internet TV with CU-SeeMe", Book, 323 pages (1995).
Savetz et al., "MBONE: Multicasting Tomorrow's Internet," IDG Books Worldwide, Inc., (1996).
Written Opinion for Corresponding PCT Application No. PCT/US2007/010729, Mailed Nov. 14, 2007, 7 pages.
US 5,715,404, 02/1998, Katseff et al. (withdrawn)

* cited by examiner

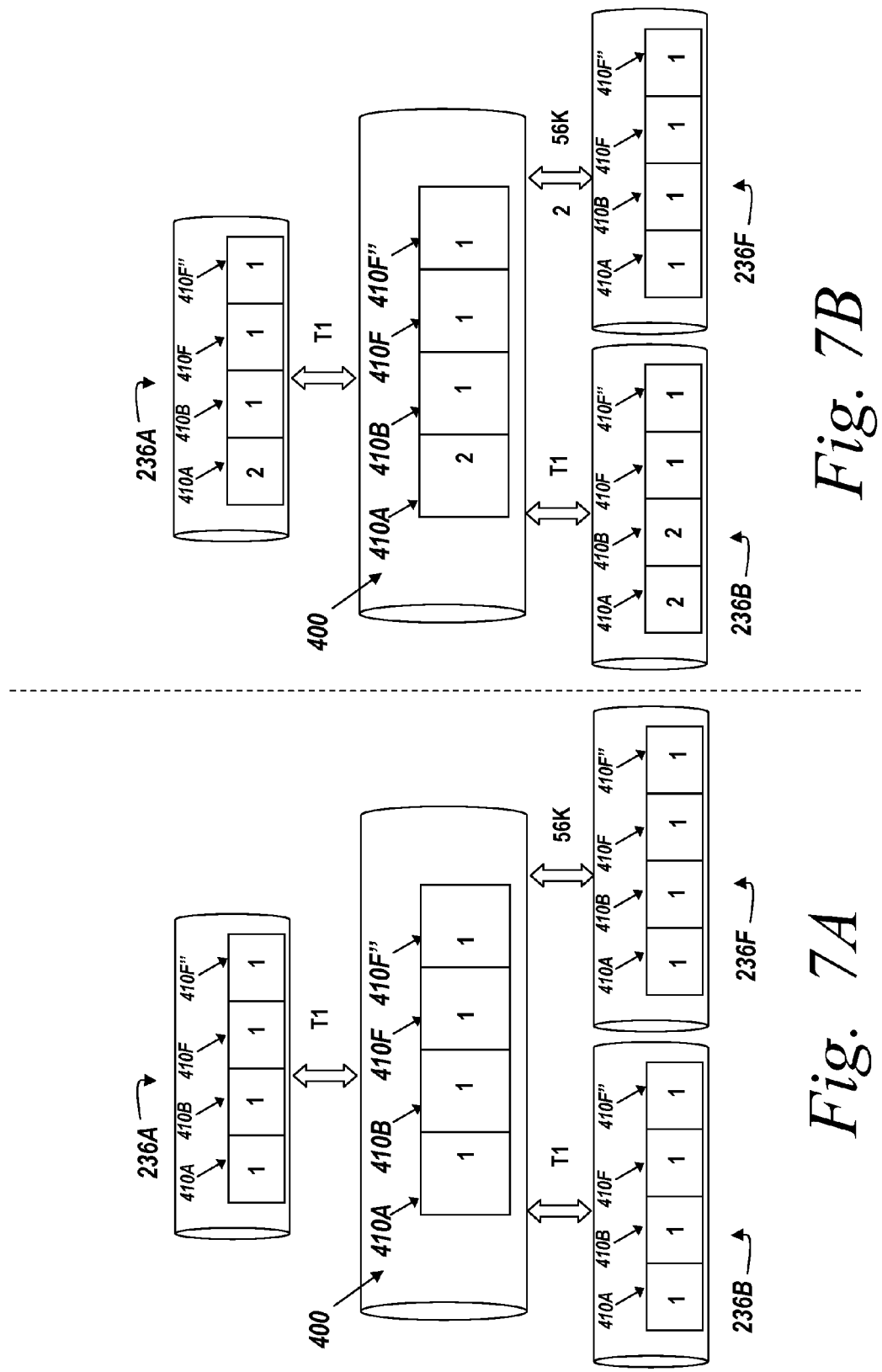

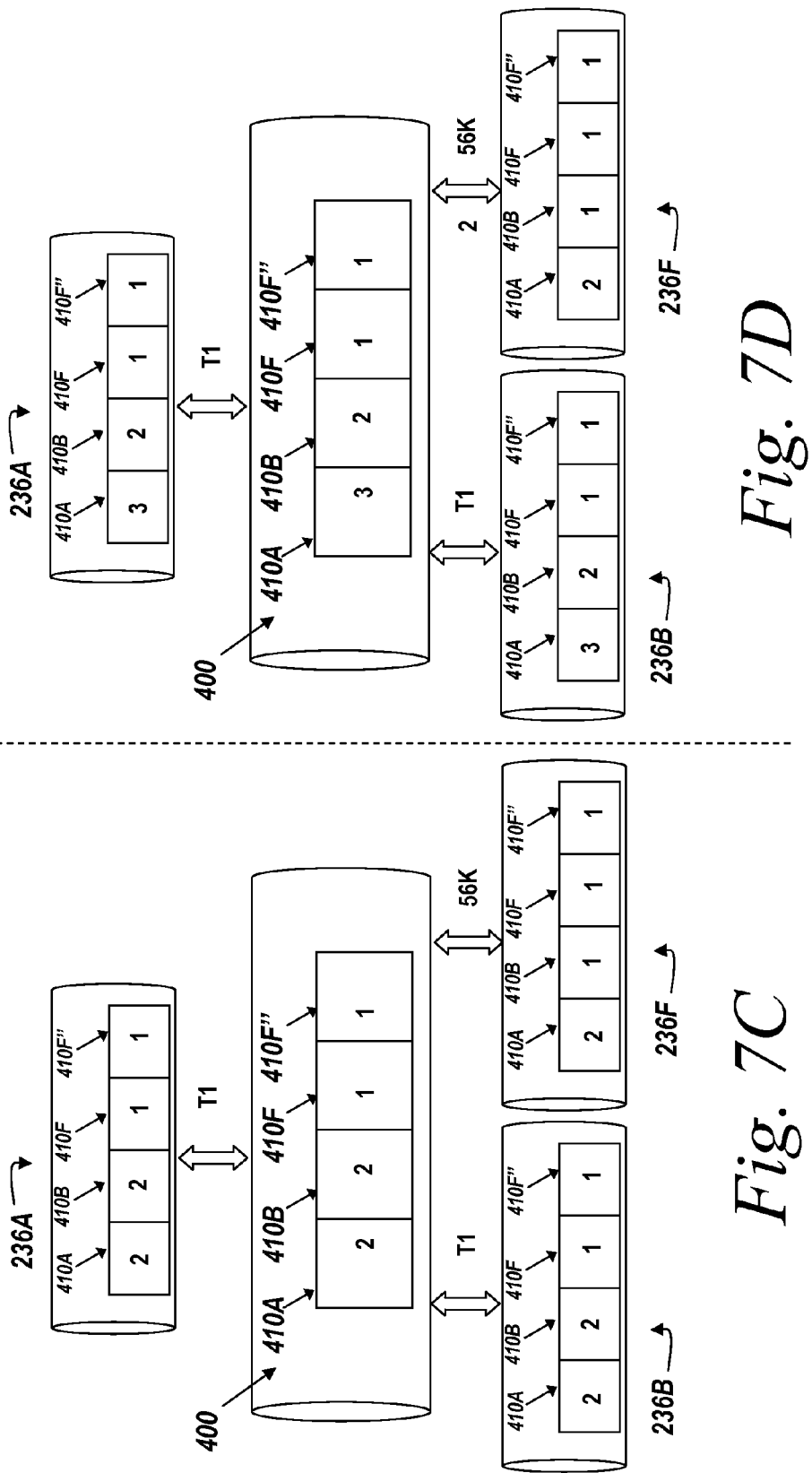

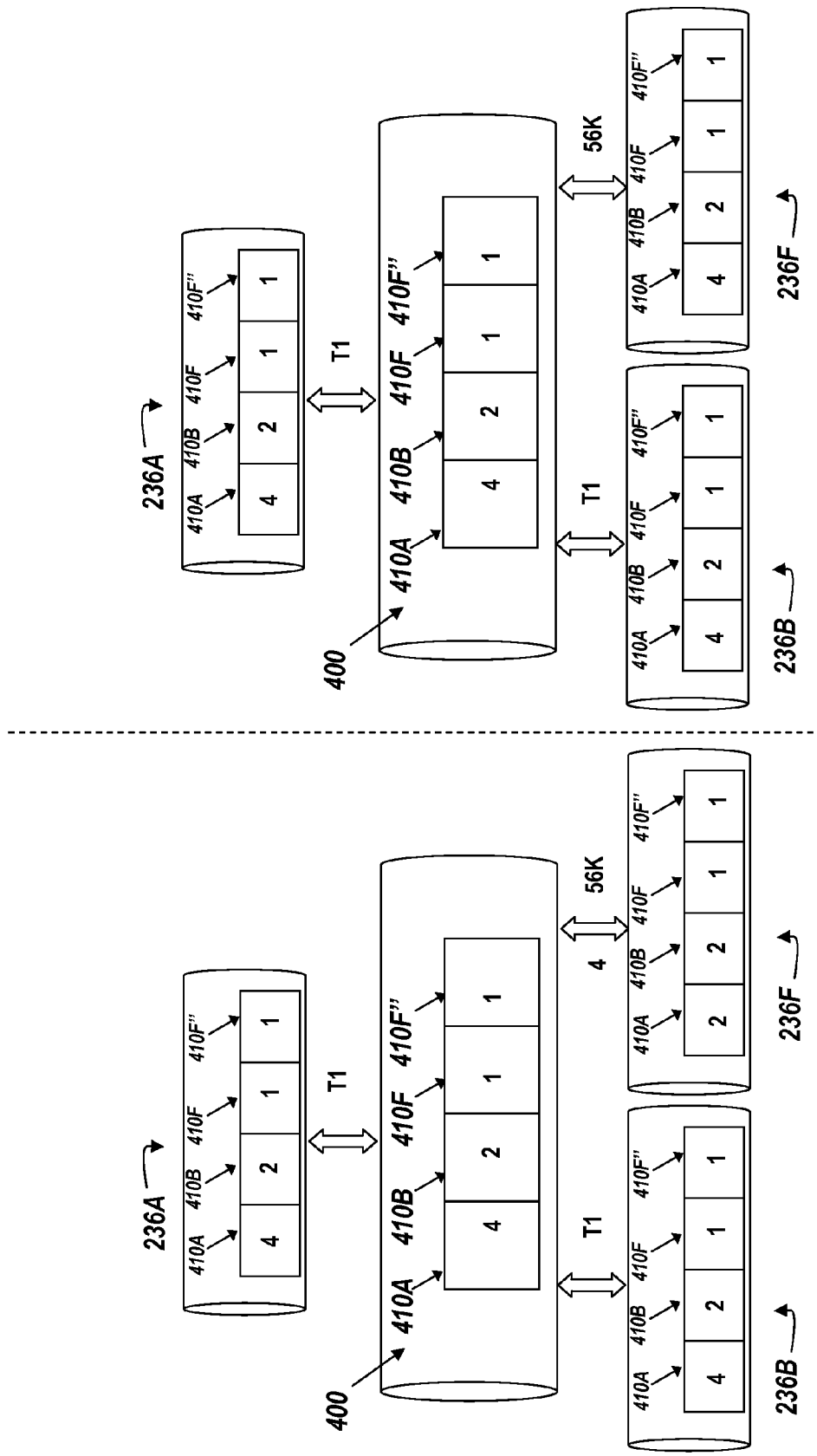

METHODS AND SYSTEMS FOR BANDWIDTH ADAPTIVE N-TO-N COMMUNICATION IN A DISTRIBUTED SYSTEM

CROSS-REFERENCE TO RELATED APPLICATIONS

The present application is a continuation of U.S. application Ser. No. 11/381,702, filed May 4, 2006, the disclosure of which is incorporated by reference herein.

FIELD OF THE INVENTION

The present invention relates generally to a communications mechanism for use between computing devices. More specifically, the invention relates to a communication mechanism for use in a distributed computing system.

BACKGROUND OF THE INVENTION

In a distributed computing environment, it is difficult to provide direct communications between large numbers of computing devices where each computing device communicates with each other computing device. For example, one solution is to use 1-to-N multicast channels. That is, each computing device (e.g., a participant to an on-line meeting or webinar) creates a multicast channel and every other computing device subscribes to every other computing device's channel. In such a solution, a system with N computing devices requires N channels and $N^2$ channel subscriptions. As a result, a need arises to maintain $O(N^2)$ state. Such a solution scales poorly for a large number of computing devices.

SUMMARY OF THE INVENTION

As a high level overview, the present inventions avoids the overhead required for the $N^2$ solution. Generally, the invention features a single shared channel to which each computing device subscribes. As s result, only N subscriptions and $O(N)$ state is required instead of $N^2$ subscriptions and $O(N^2)$ state required by when using N 1-to-N multicast channels. Each computing devices publishes it its current state on the shared channel in the form of a set of packets. Each computing device receives updates of the other computing devices' state.

Also, in some cases, the invention features the ability to propagate data in a bandwidth adaptive manner. This allows for computing devices with both slow (e.g., 56K) and fast (e.g., T1 and broadband) connection speeds to participate in the system without interfering with one another.

In one aspect, the invention features a method for bandwidth adaptive communication among a plurality of participants in a distributed system. The method includes receiving a communication from a first participant, storing payload data in a channel memory element, and transmitting the payload data to a second participant. The communication includes metadata and payload data. The channel memory element includes a plurality of memory locations. One of the plurality of memory locations is selected using the metadata and is associated with the first participant.

In one embodiment, the communication includes a participant identifier and payload data. The communication can represent the state of the participant and include metadata and payload data.

In another embodiment, storing includes storing the payload data in one of a plurality of array locations. The one of the plurality of array locations is selected using the metadata and associated with the first participant.

In other embodiments, transmitting includes transmitting the array to a second participant. Transmitting also can include transmitting the payload data to a second participant in response to information identifying the first participant payload data most-recently received from the first participant. Transmitting can also include transmitting the payload data to a second participant in response to a request from the second participant. Further, transmitting can include transmitting the payload data to a second participant in response to a request from the second participant. The request identifies the first participant payload data most-recently stored by the second participant.

In another embodiment, the method includes before transmitting, receiving a second communication from the first participant. The communication includes second payload data. Further, the method includes storing the second payload data in the one of a plurality of memory locations associated with the first participant.

In yet another embodiment, the method includes receiving a communication from a second participant, storing the payload data in one of a plurality of memory locations, and transmitting the payload data to the first participant. The communication includes metadata and payload data. The one of the plurality of memory locations is selected using the metadata and associated with the second participant.

In another embodiment, the method includes receiving a second communication from the first participant. Further, the method includes storing the second communication in a second memory location associate with the first participant.

In another aspect, the invention features a distributed system for bandwidth adaptive communication among a plurality of participants. The system includes a plurality of participants transmitting state data and a server. The server receives the state data transmitted by the plurality of clients, stores the received state data in a memory element having a plurality of memory location, and transmits the state data received from one of the plurality of participants to each of the other ones of the plurality of participants. Each of the plurality of memory locations is associated with a respective one of the plurality of participants.

BRIEF DESCRIPTION OF THE DRAWINGS

The foregoing discussion will be understood more readily from the following detailed description of the invention, when taken in conjunction with the accompanying drawings, in which:

FIGS. 7A-7F shows block diagrams of the shared communication channel used to illustrate an exemplary use of an embodiment of the invention.

DETAILED DESCRIPTION

Figure 1:
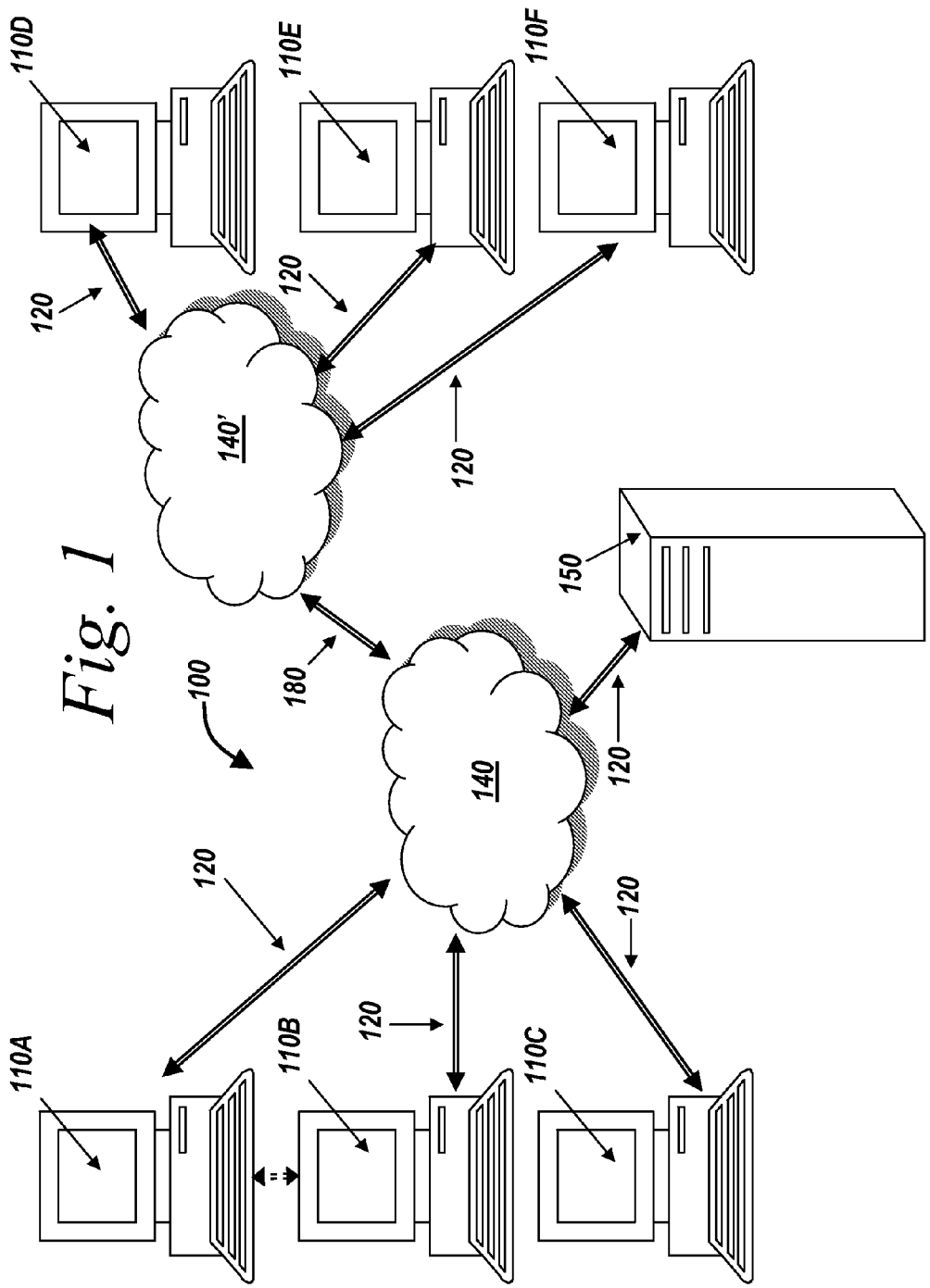
FIG. 1 shows an embodiment of distributed computing environment.

With reference to FIG. 1, a distributed computing environment 100, which can be used for on-line collaboration and the like, includes one or more participant computing devices 110A, 110B, ..., 110F (hereinafter each participant computing device or plurality of computing devices is generally referred to as participant 110) are in communication with one or more server computing devices 150 (hereinafter each server computing device or plurality of computing devices is generally referred to as server 150) via a communications network 140. The network 140 can be a local-area network (LAN), a medium-area network (MAN), or a wide area network (WAN) such as the Internet or the World Wide Web. Users of the participants 110 connect to the network 140 via communications link 120 using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the participants 110 communicate with the server 150 through a second network 140', through a communication link 180 that connects network 140 to the second network 140'. The protocols used to communicate through communications link 180 can include any variety of protocols used for long haul or short transmission. For example, TCP/IP, IPX, SPX, NetBIOS, NetBEUI, SONET and SDH protocols. The combination of the networks 140, 140' can be conceptually thought of as the Internet. As used herein, Internet refers to the electronic communications network that connects computer networks and organizational computer facilities around the world.

The participant 110 can be any personal computer, server, Windows-based terminal, network computer, wireless device, information appliance, RISC Power PC, X-device, workstation, minicomputer, personal digital assistant (PDA), main frame computer, cellular telephone or other computing device that provides sufficient faculties to execute participant software and an operating system. Participant software executing on the participant 110 provides the ability to read and write to a shared communication channel established among the participants 110 and the server 150.

The server 150 can be any type of computing device that is capable of communication with one or more participants 110. For example, the server 150 can be a traditional server computing device, a web server, an application server, a DNS server, or other type of server. In addition, the server 150 can be any of the computing devices that are listed as participant devices. In addition, the server 150 can be any other computing device that provides sufficient faculties to execute server software and an operating system. Server software executing on the server 150 provides the functionality to create a shared communication channel among the participants 110 and the server 150. Additional functionality provided by the server software includes, but is not limited to, reading and writing to the shared communication channel.

In one embodiment, different channels carry different types of communications among the participants 110 and the server 150. For example in an on-line meeting environment, a first communication channel carries screen data from a presenting participant 110 to the server 150, which, in turn, distributes the screen data to the other participants 110. A second communications channel is shared, as described in more detail below, to provide real-time, communications (e.g., chat information, business card information, question and answer information, polling information, session feedback information, voice data, video data, distributed control information, state information, and the like) among the participants.

Figure 2:
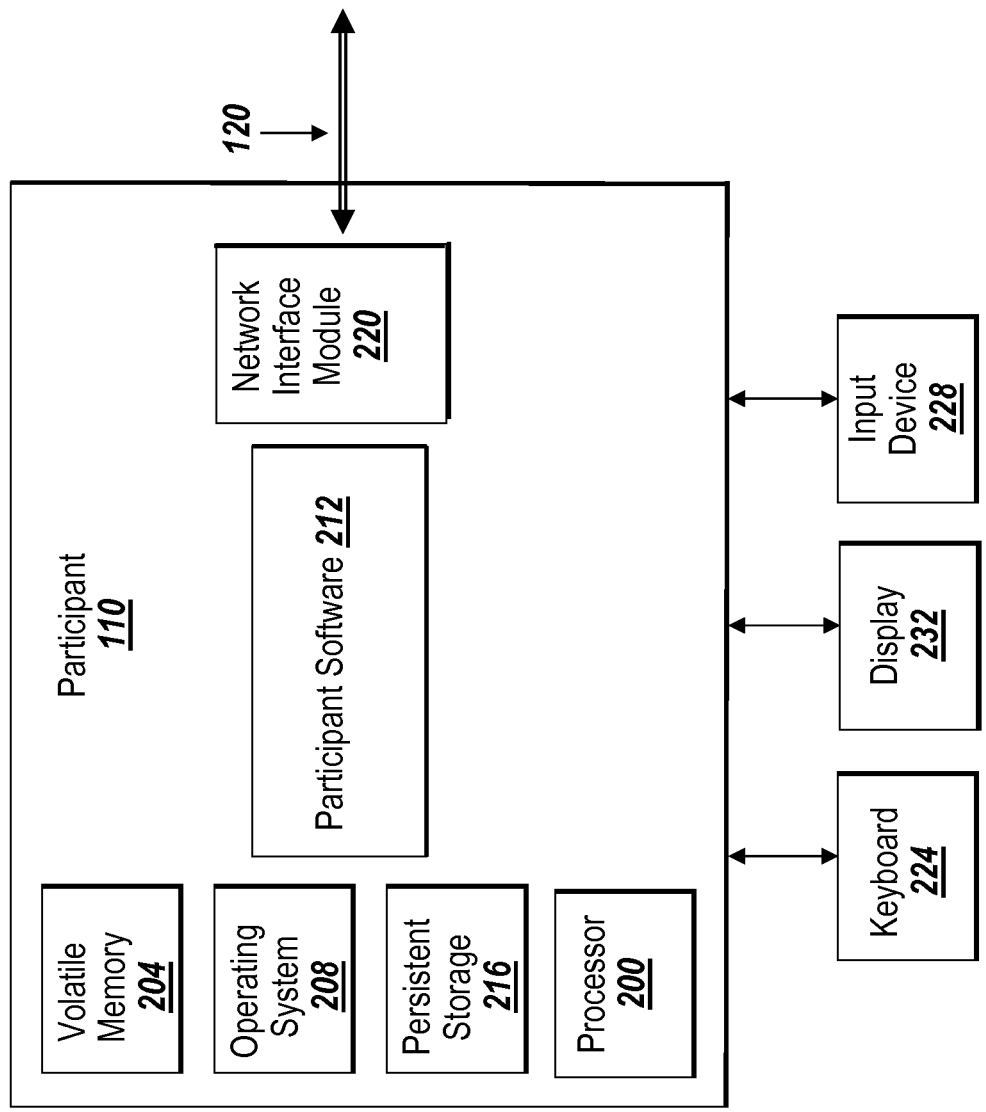
FIG. 2 shows an embodiment of a participant computing device of the distributed computing environment of FIG. 1.

FIG. 2 depicts a conceptual block diagram of a participant 110. It should be understood that other embodiments of the participant 110 can include any combination of the following elements or include other elements not explicitly listed. In one embodiment, each participant 110 typically includes a processor 200, volatile memory 204, an operating system 208, participant software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device) in electrical communication with the participant 110, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, VMWARE and the like.

The participant software 212 is in communication with various components (e.g., the operating system 208) of the participant 110 to provide features of the invention. As a general overview, the participant software 212 creates and maintains a local copy of the shared channel. The participant software 212 provides a means to read and write data to the shared channel and transmit the changes to the other participants 110 and the servers 150.

Figure 3:
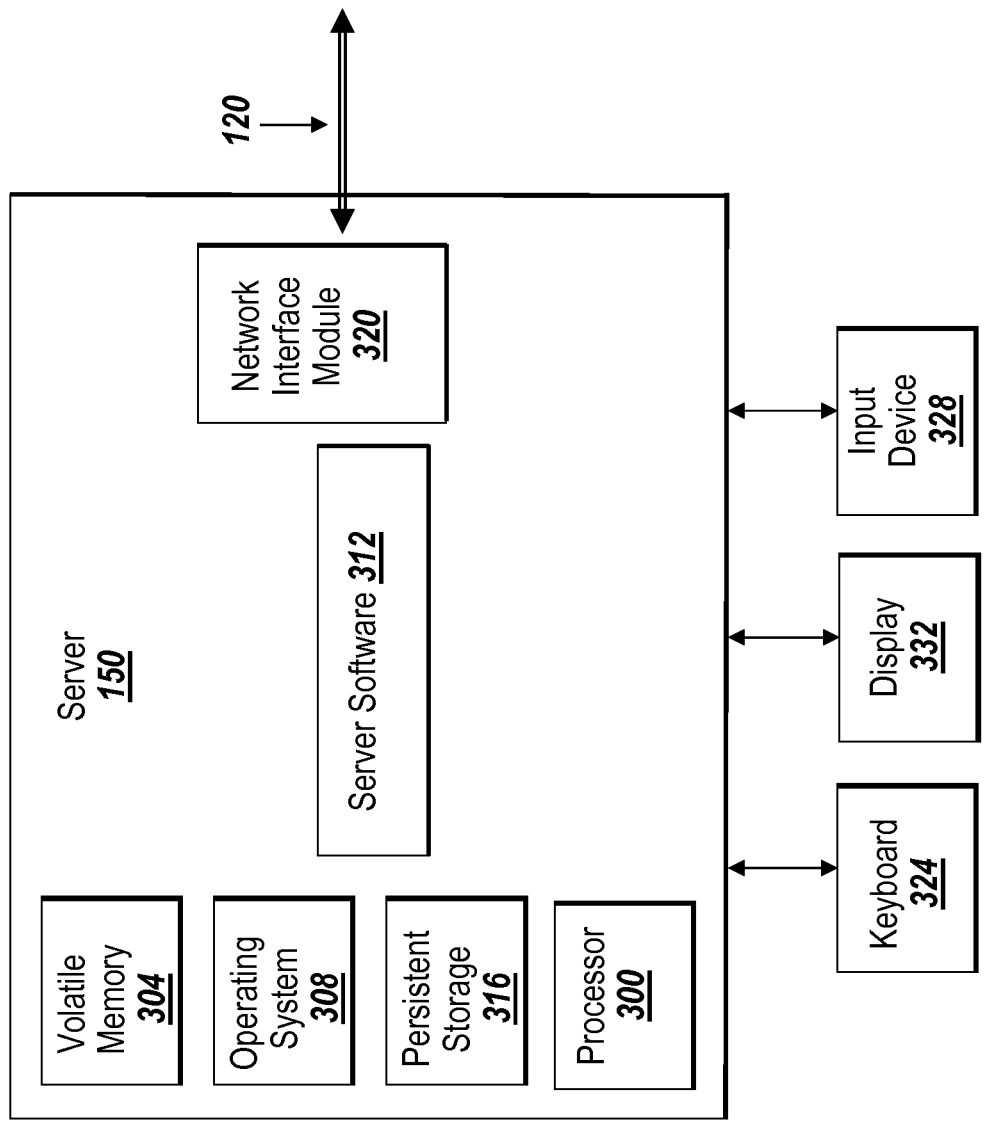
FIG. 3 shows an embodiment of a server computing device of the distributed computing environment of FIG. 1.

With reference to FIG. 3, an embodiment of a server 150 is described. It should be understood that other embodiments of the server 150 can include any combination of the following elements or include other elements not explicitly listed. The server 150 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. In another embodiment, the sever 150 operates in a "headless" mode. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, VMWARE and the like.

The server software 312 is in communication with various components (e.g., the operating system 308) of the server 150 to provide features of the invention. As a general overview, the server software 312 creates the shared channel and maintains a local copy of the shared channel state. The server software 312 provides a means to transmit the changes to the other participants 110 or other servers 150.

Figure 4:
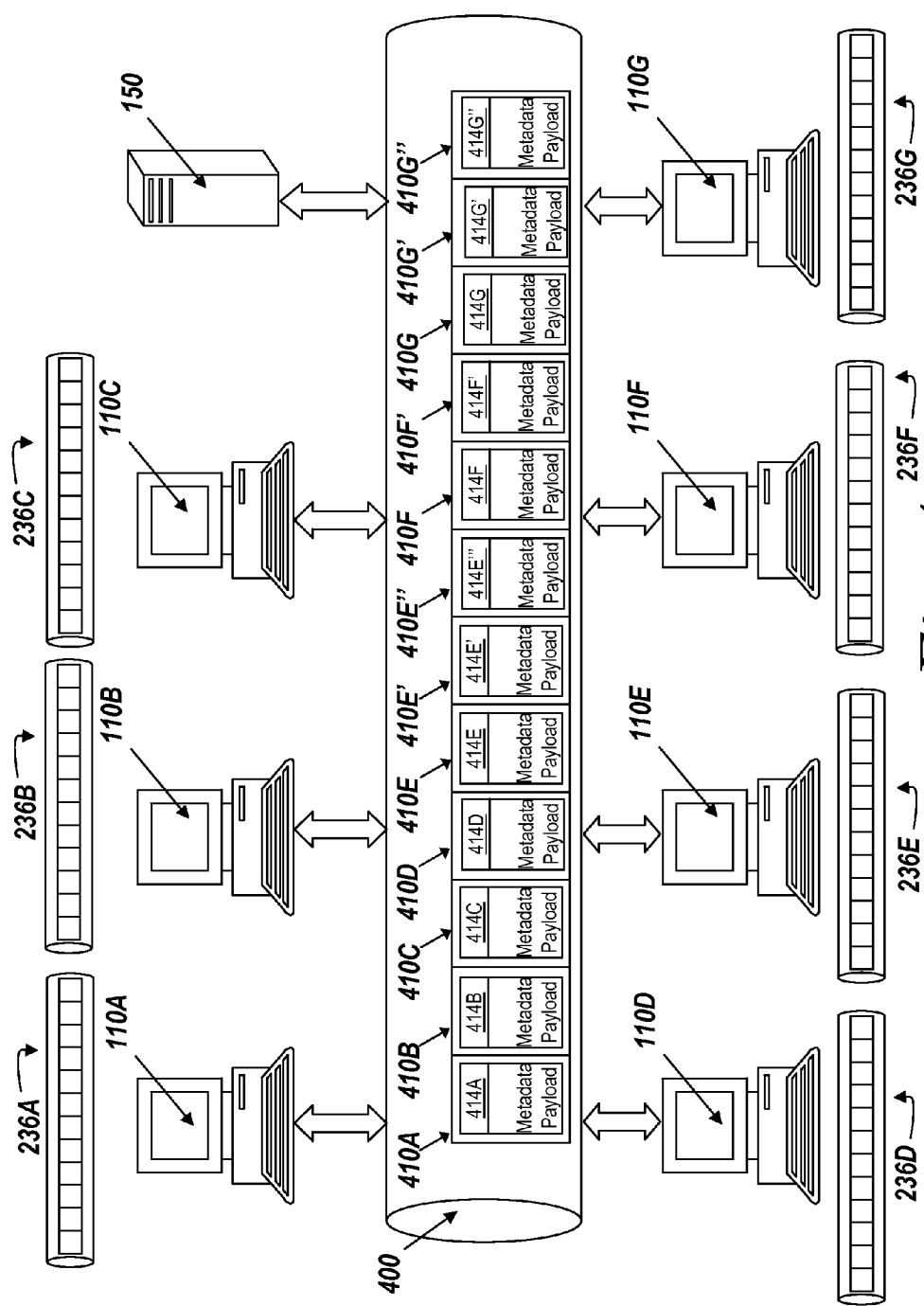
FIG. 4 is a block diagram of an embodiment of a shared communication channel.

With reference to FIG. 4, an embodiment of a shared communications channel 400 as used within the environment 100 is shown and described. The shared communications channel 400 is a single channel to which the participants 110 subscribe. Each participant 110 maintains a local copy 236A, 236B, 236C, 236 D, 236E, 236F, 236G (hereinafter referred to as local copy 236) of the shared communications channel 400. On a conceptual level, the shared communications channel 400 can be thought of as a single data object (e.g., a channel memory element) having a plurality of memory locations 410 or fields. Theses memory locations 410 or fields can be conceptually thought of as "slots" in the channel. As shown, the shared data channel includes twelve fields 410 (i.e., 410A, 410B, 410C, 410D, 410E, 410E', 410E'', 410F, 410F', 410G, 410G', 410G'') that collectively represent the state of the shared channel 400, although any number of fields can be used. A single participant 110 or server 150 has zero or more fields 410 associated therewith. For example, as illustrated in FIG. 4 the participant 110G has three fields 410G, 410G', 410G'' associated therewith. It should be understood, even though not shown, that the server 150 can have zero or more fields associated therewith.

Each field 410 stores a respective data packet 414 (i.e., i.e., 414A, 414B, 414C, 414D, 414E, 414E', 414E'', 414F, 414F', 414G, 414G', 414G'). Each participant can read each of the memory locations 410 of the shared channel, but can only write to those memory locations 410 associated with the respective participant 110. Each data packet 414 includes metadata and payload data. The metadata can include, but is not limited too, a participant ID, a memory location ID, and the like. The payload data can include, but is not limited to, communication data, chat data, state data, video data, distributed control data, and the like. In one embodiment, each field 410 is includes one or more array locations. Each array location stores one of the metadata and the payload data. The array locations can be conceptually thought of as sub-slots within each slot of the shared channel 400.

Figure 5:
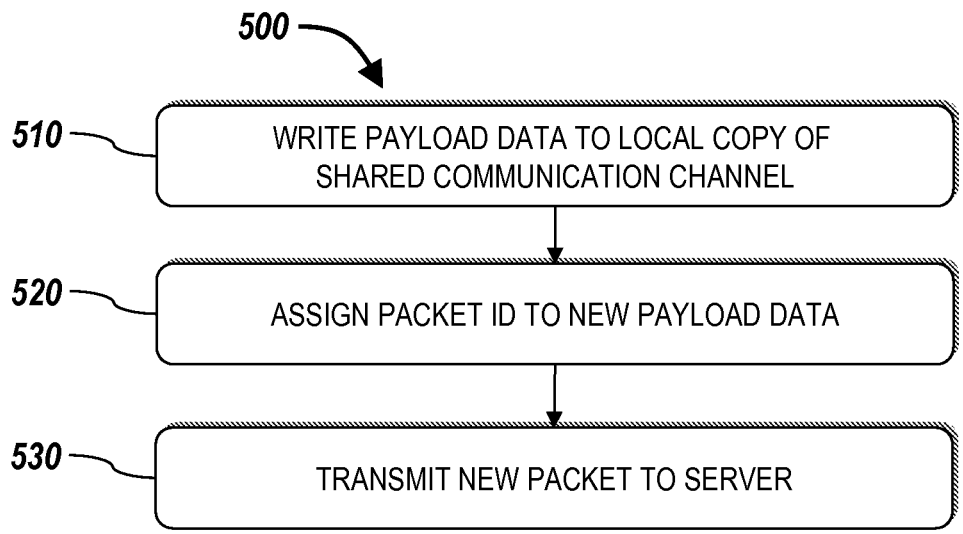
FIG. 5 is a flow chart of a embodiment of a method of the operation of the participant software of the participant computing device of FIG. 2.

With reference to FIG. 5, an embodiment of the method 500 of operation of the participant software 212 is described. As previously stated, each participant maintains a local copy of the state of the shared channel 400. The participant 110 writes (STEP 510) payload data to the associated memory location 410 of the local copy of the shared channel 400. The participant software 212 assigns (STEP 520) a packet identifier to the payload data to generate a data packet 414. In one embodiment, when the bandwidth connecting the participant 110 to the server 150 allows the participant software 212 transmits (STEP 530) the new packet to the server 150.

In one embodiment, the participant software 212 assigns (STEP 520) a monotonically increasing packet identifier. As used herein, monotonic refers to changing in one direction only; thus either strictly rising or strictly falling, but not reversing direction. In other embodiments, it should be understood that, other packet identifiers are used. Using monotonically increasing packet identifiers provides a means to allow synchronization among the local copies 236 of the shared communications channel 400 and the latest state data of shared communications channel 400 stored by the server 150.

The transmitting (STEP 530) of the packet 414 to the shared communication channel 400 occurs after completion of the write operation of the participant. In one embodiment, the transmission occurs when the bandwidth between the participant 110 and the server 150 permits. This feature provides a bandwidth adaptive transmission module. For example, assume the participant 110A is connected to the server 150 using a 56 k modem the speed at which changes between the participant 110A and the server 150 are communicated differs greatly than if the participant 110A and the server 150 are connected by a T1 line. As such, the participant 110A waits until the bandwidth permits the transmission. These same bandwidth adaptive principles also apply when the participant 100 receives packets 414 from the server 150.

Figure 6:
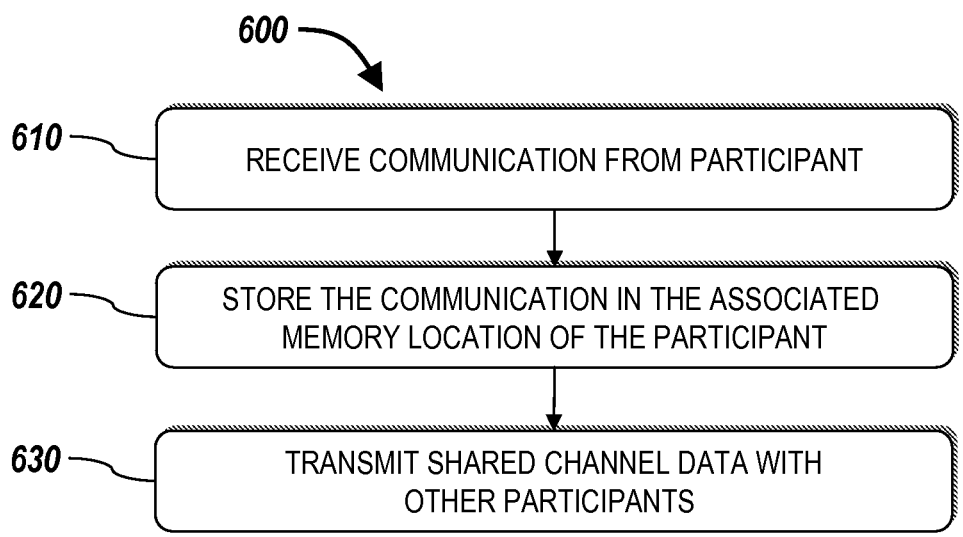
FIG. 6 is a flow chart of an embodiment of a method of the operation of the server software of the server computing device of FIG. 2.

With reference to FIG. 6, a method 600 of the operation of the server software 312 is shown and described. The server 150 receives (STEP 610) the communication containing the packet 414 from the participant 110. In response, the server software 312 stores (STEP 620) the packet in the associated memory location 410. Upon changing the memory location 410, the server software begins to transmit (STEP 630) the state data of the shared channel 400 to the other participants 110.

In one embodiment, storing (STEP 620) includes overwriting the contents of the associated memory location 410 by the server software 312 with the new packet 414. Prior to overwriting the contents of the associated memory location 410, the server software compares the packet identifier to determine if the received packet is actually newer than the current packet. A situation can arise, due to the bandwidth limitations connecting some of the participants 110 to the server 150 and when the system includes multiple servers 150 or peer-to-peer connection, where some of the packets 410 by the server software may actually be older than the current packet stored in the memory location. These situation are described below in more detail.

In one embodiment, transmitting (STEP 630) includes transmitting the entire contents of the shared communications channel 400 to each of the other participants 110. The transmission can occur in a multicast manner or some other manner. In another embodiment, only the updated memory locations 410 are transmitted to the participants. Said another way, the server software 312 synchronizes the contents of the shared channel with each of the participants. The synchronization occurs using either a "push" from the server 150 to the participants 110 or a "pull" from the participants. Each of which is described below.

In the case of a push from the server 150, a running history of the state of the shared channel 400 is maintained by the server 150 for each participant 110. When the server 150 receives a new packet 410, the server software 312 compares the present state of the shared communication channel 400 to the record of the running history to determine which packets 414 to transmit to the participant 110. Prior to transmitting the new packets 414 to the participant, the server software receives an indication or determines whether the bandwidth connecting the participant 110 to the server 150 is available to complete the communication. If the bandwidth is available, the new packets are transmitted. If the bandwidth is not available, the new packets are not transmitted. Instead, when the bandwidth is available a new comparison against the running history is performed and all the new packets are transmitted. As such, intermediate changes to the shared communications channels 400 are captured and sent to the participant.

In a pull model, each participant 100 periodically queries the server 150 for changes to the state of the shared communications channel 400. In one embodiment, each time a new packet is sent from the participant 110 to the server 150, a request for any new packets of the other participants 110 is included. In another embodiment, each participant 110 queries the server 150 every number of predetermined milliseconds or other time period. In still another embodiment, each participant 110 queries the server 150 when the bandwidth connecting the server 150 and the participant 110 is available to receive updates. As part of the query, the present state of the local copy 236 of the shared channel is transmitted to the server 150. The server software 312 compares the local copy 236 with the present state of the shared communication channel 400 to determine which packets to transmit to the requesting participant 110.

The described synchronization methods, provide a "loose" synchronization of the state of the shared communications channel 400 among the participants 110 and the server. The local copies 236 of the participants 110 differ during transitional periods while the synchronization mechanism propagates the changes. Given sufficient time and no new changes, each of the local copies 236 will converge to the same state of the shared communications channel 400. It is important to note that if the communication link between the server 150 and the participant 110 is bandwidth limited, the associated memory location 410 for the participant may be updated one or more times by the participant 110 before the new packet 410 is transmitted to the server 150. It should be understood that the same principles apply to receiving packets 414 from the server. This described synchronization does not guarantee delivery of all packets from a participant 110 to the server 150 or conversely from the server 150 to the participant 110. It only guarantees the deliver of the most recent packet when the bandwidth is available. This relatively weak delivery guarantee describes that bandwidth adaptive nature of the distributed computing environment, because it allows participants 110 and servers 150 with slower communication links 120 to coexist with participants 110 and servers 150 with faster communication links 120 without affecting one another. The participants 110 and servers 150 connected by slower (i.e., bandwidth limited) links receive fewer updates while participants 110 and servers 150 connected by faster communication links 120 (i.e., higher bandwidth links) may receive all updates.

With reference to FIG. 7A through FIG. 7 F, an example is shown and described. The following examples include the shared communications channel 400 and the local copy 236A, 236B, 236F of three participants 110A, 110B, 110F. For simplicity, each packet 414 is referred to a single number. It should be understood that each number represents the metadata and payload data of the packet 414. In the example, it is assumed that two of the participants 110A, 110B are connected to the server 150 by a T1 connection and one participant 110F is connected to the server 150 by a 56K modem.

In FIG. 7A, the state of each of the local copies 236 and the shared channel 400 is consistent. In FIG. 7B, a change to the memory location 410A of the local copy 236A of the shared channel occurs by the first participant 110A and is propagated to the shared channel 400 and, in turn, to the other two participants. The second participant 236B, which is connected via a T1 lines, receives the change to the memory location 410A associated with the participant 110A. However, due to the reduced bandwidth connecting the third participant 236F to the server 150, the new packet associated with the memory location 410A is not received as quickly. In addition a change to the local copy of the memory location 410B associated with the second participant 236B occurs. As shown, the states of the various copies of the shared communications channel 400 are in different states.

In FIG. 7C, the change by the second participant 110B is propagated to the shared channel 400 and, in turn, to the first participant 110A. However, due to the bandwidth limitation the change to memory location 410B has not be received by the third participants 110F. In FIG. 7D, another change to the memory location 410A associated with first participant 110A and is propagated to the second participant 110B. However, because the third participant 110F is in the process of receiving the change to the memory location 410B, the third participant does not receive the change from the first participant 110A at this time.

In FIG. 7E, the first participant writes another change (i.e., packet 4) to its memory location 410A. The shared channel 400 receives the change and forwards it to the second participant 110B and the third participant 110F. As shown in FIG. 7F, after some period of time, each of the local copies 236 of the shared channel eventually reaches the same state. However, as illustrated each of the local copies 236 of the shared channel can have differing states during periods of updates and not all local copies will receive each and every update. Although described in manner that updates are received from the server 150, it should be understood that the same principles apply in transmitting changes to the server 150 from the participant 110. That is, the participant 110 may write multiple packets to its associated memory location 410 of the local copy 236, some of which might not be transmitted to the server 150 due to the bandwidth limitations connecting the server 150 and the participant 110.

Figure 8:
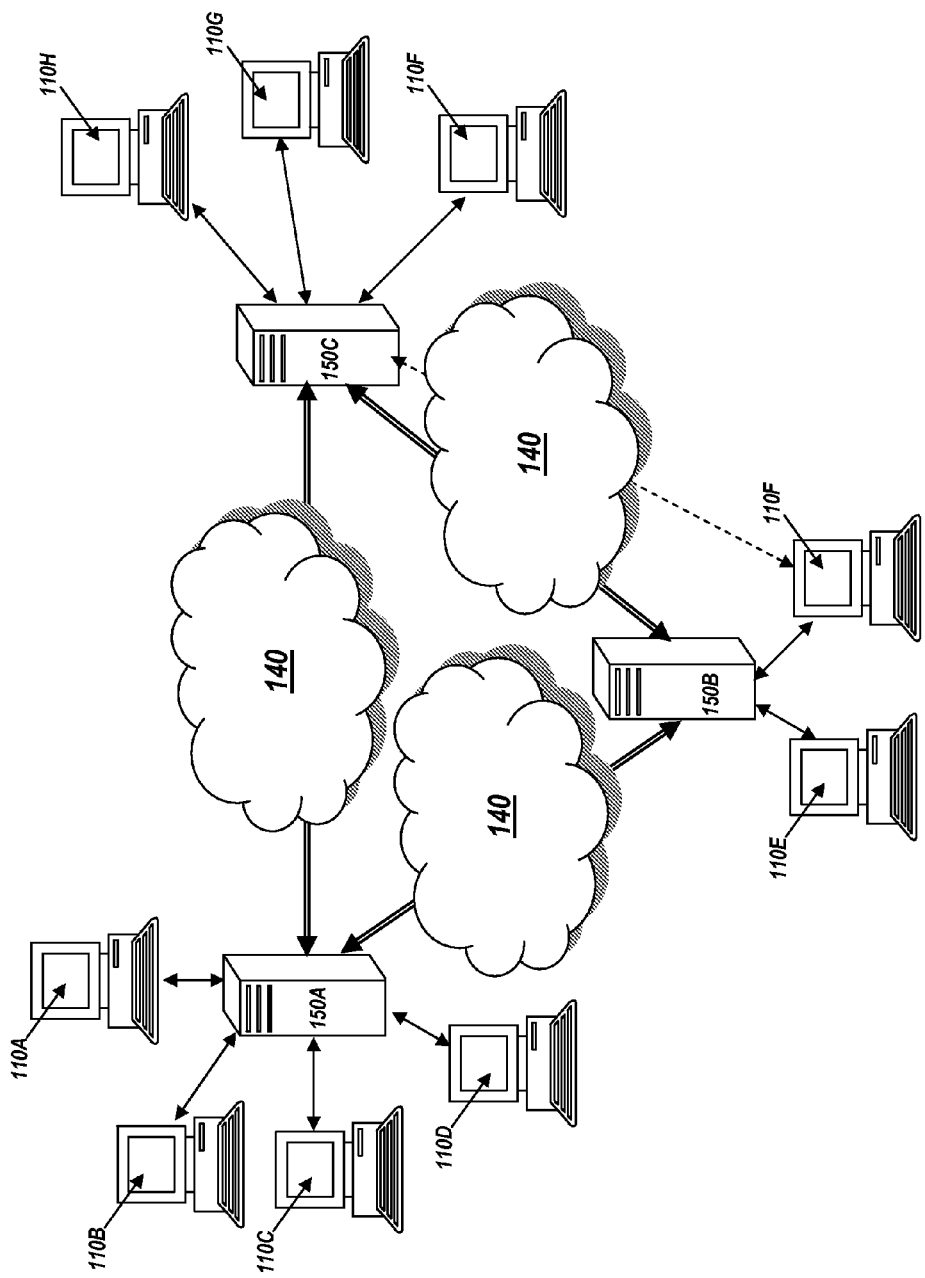
FIG. 8 shows another embodiment of distributed computing environment in which principles of the invention can be practiced.

With reference to FIG. 8, a distributed computing environment 100' having multiple servers 150A, 150B, 150C is shown and described. In such an environment, each server 150 is also a participant because is receives updates to the shared communications channel 400 from the other servers 150. In large on-line collaboration situations (e.g., a webinar having thousands of participants) it is difficult for a single server 150 to manage and service the all the connection requests from the participants. As such, multiple servers 150 are used to balance the load each server 150 must handle. The shared communications channel 400 provides a way to each communication server 150 and the participants 110 to communicate with each other without requiring a number-of-participants-squared communication scheme.

In such an embodiment, the servers 150 may be communicating with each other using different bandwidth allocations. As such, the bandwidth adaptive features described above apply equally to communications among the servers 150 as well as among the servers 150 and the participants 110.

Also, a single participant can communicate with multiple servers 150. For example, participant 110F communicates with a first server 150B and a second server 150C. The participant 110F maintains a local copy of the state of the shared channel 400 as known by each of the first server 150B and the second server 150C. Such an embodiment provides redundancy and fault tolerance with respect to the state of the shared channel 400.

One exemplary implementation of the described invention is use in an on-line collaboration product to perform on-line meetings or webinars. An on-line meeting consists of one or more participants 110 that communicate through a communication server 150. It should be understood that multiple communications server 150 can used if the number of participants require more than a single communication server 150. In an on-line meeting, one of the participants is a presenter and controls the flow of the meeting. A presenter transmits a series of images that may represent a slide presentation. As the presenter displays a slide, the page image representing that slide is transmitted to all viewers. In many embodiments, each slide is represented by multiple data packets and transmitted over specific channel designated for screen sharing data. Each of the participants 110 are labeled "viewers" and view the shared screen data. Synchronization of the shared screen data among the viewers and presenter occurs using a reliable multicast protocol. This type of "sharing" represents a 1-to-N type of communication.

In addition to sharing screen data it is desirable to enable "chat" communication among the viewers and the presenter (e.g., viewer to viewer communication as well as viewer to presenter communications). As such, a shared channel 400 is established among the presenter and viewers to carry the chat data. Each viewer need to only subscribe to the shared channel to enable the chat feature of the on-line meeting. Each time the viewer types a chat message, the viewer's respective field 410 of the shared channel is updated with the new message payload. In response, the updated chat data is transmitted to the other viewers and presenter as described above. This type of "sharing" represents an N-to-N type of communication.

There are numerous on-line collaboration products that can operate in the distributed computing environment 100. Exemplary products include, but are not limited to GOTOMEETING and GOTOWEBINAR offered by Citrix Online, LLC of Santa Barbara Calif. Certain aspects and features described below can be embodied in such a product. Other products include WEBEX EMX, WEBEX ENTERPRISE EDITION, WEBEX EVENT CENTER, WEBEX GLOBALWATCH, WEBEX MEETING CENTER, WEBEX MEETMENOW, WEBEX PRESENTATION STUDIO, WEBEX SALES CENTER, WEBEX TRAINING CENTER, WEBEX WEBOFFICE, AND WEBEX WORKSPACE offered by WebEx Communications, Inc. of Santa Clara Calif. Another example is the LIVEMEETING product offered by of Microsoft Corporation of Redmond, Wash.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Although the present invention has been described with reference to specific details, it is not intended that such details should be regarded as limitations upon the scope of the invention, except as and to the extent that they are included in the accompanying claims.

What is claimed is:

1. A method for bandwidth adaptive communication among a plurality of participants in a distributed system, the method comprising:

receiving, at a server, a communication from a first participant computing device, the communication including metadata and payload data;

storing the payload data in a channel memory element of the server, the channel memory element comprising a plurality of memory locations, one of the plurality of memory locations selected using the metadata and associated with the first participant computing device;

comparing contents of the channel memory element to a first record, residing at the server, of a copy of the channel memory element locally maintained by a second participant computing device, the first record being associated with the second participant computing device, wherein the first record is different from the one of the plurality of memory locations selected using the metadata and associated with the first participant computing device;

transmitting the payload data to the second participant computing device and updating the first record, residing at the server, upon a determination that the comparing between the contents of the channel memory element and the first record, residing at the server, of the copy of the channel memory element locally maintained by the second participant computing device reveals an update to the payload data stored in the selected one of the plurality of memory locations;

comparing contents of the channel memory element to a second record, residing at the server, of a copy of the channel memory element locally maintained by a third participant computing device, the second record being associated with the third participant computing device, wherein the second record is different from the one of the plurality of memory locations selected using the metadata and associated with the first participant computing device; and transmitting the payload data to the third participant computing device and updating the second record, residing at the server, upon a determination that the comparing between the contents of the channel memory element and the second record, residing at the server, of the copy of the channel memory element locally maintained by the third participant computing device reveals an update to the payload data stored in the selected one of the plurality of memory locations;

wherein, during a given time period, the payload data is equivalent to the first record more often than the payload data is equivalent to the second record.

2. A non-transitory computer-readable medium for bandwidth adaptive communication among a plurality of participants in a distributed system, the computer-readable medium comprising instructions which, when executed by one or more computers, cause the one or more computers to implement a method, the method comprising:

receiving, at a server, a communication from a first participant computing device, the communication including metadata and payload data;

storing the payload data in a channel memory element of the server, the channel memory element comprising a plurality of memory locations, one of the plurality of memory locations selected using the metadata and associated with the first participant computing device;

comparing contents of the channel memory element to a first record, residing at the server, of a copy of the channel memory element locally maintained by a second participant computing device, the first record being associated with the second participant computing device, wherein the first record is different from the one of the plurality of memory locations selected using the metadata and associated with the first participant computing device;

transmitting the payload data to the second participant computing device and updating the first record, residing at the server, upon a determination that the comparing between the contents of the channel memory element and the first record, residing at the server, of the copy of the channel memory element locally maintained by the second participant computing device reveals an update to the payload data stored in the selected one of the plurality of memory locations;

comparing contents of the channel memory element to a second record, residing at the server, of a copy of the channel memory element locally maintained by a third participant computing device, the second record being associated with the third participant computing device, wherein the second record is different from the one of the plurality of memory locations selected using the metadata and associated with the first participant computing device; and transmitting the payload data to the third participant computing device and updating the second record, residing at the server, upon a determination that the comparing between the contents of the channel memory element and the second record, residing at the server, of the copy of the channel memory element locally maintained by the third participant computing device reveals an update to the payload data stored in the selected one of the plurality of memory locations;

wherein, during a given time period, the payload data is equivalent to the first record more often than the payload data is equivalent to the second record.

3. A system for bandwidth adaptive communication among a plurality of participants, the system comprising:

one or more processors; and a memory comprising instructions which, when executed by one or more processors, cause the one or more processors to implement a method, the method comprising:

receiving, at a server, a communication from a first participant computing device, the communication including metadata and payload data;

storing the payload data in a channel memory element of the server, the channel memory element comprising a plurality of memory locations, one of the plurality of memory locations selected using the metadata and associated with the first participant computing device;

comparing contents of the channel memory element to a first record, residing at the server, of a copy of the channel memory element locally maintained by a second participant computing device, the first record being associated with the second participant computing device, wherein the first record is different from the one of the plurality of memory locations selected using the metadata and associated with the first participant computing device;

transmitting the payload data to the second participant computing device and updating the first record, residing at the server, upon a determination that the comparing between the contents of the channel memory element and the first record, residing at the server, of the copy of the channel memory element locally maintained by the second participant computing device reveals an update to the payload data stored in the selected one of the plurality of memory locations;

comparing contents of the channel memory element to a second record, residing at the server, of a copy of the channel memory element locally maintained by a third participant computing device, the second record being associated with the third participant computing device, wherein the second record is different from the one of the plurality of memory locations selected using the metadata and associated with the first participant computing device; and transmitting the payload data to the third participant computing device and updating the second record, residing at the server, upon a determination that the comparing between the contents of the channel memory element and the second record, residing at the server, of the copy of the channel memory element locally maintained by the third participant computing device reveals an update to the payload data stored in the selected one of the plurality of memory locations;

wherein, during a given time period, the payload data is equivalent to the first record more often than the payload data is equivalent to the second record.

4. The method of claim 1 wherein a received communication comprises an identifier of the first participant computing device and the payload data.

5. The method of claim 1, wherein a received communication represents a state of the first participant computing device and comprises metadata and payload data.

6. The method of claim 1, wherein the storing step comprises storing the payload data in one of a plurality of array locations, the one of the plurality of array locations selected using the metadata and associated with the first participant computing device.

7. The method of claim 6, wherein the transmitting to the second participant computing device step comprises transmitting the array to the second participant computing device.

8. The method of claim 1, wherein the transmitting to the second participant computing device step comprises transmitting the payload data to the second participant computing device in response to information identifying the first participant computing device payload data most-recently received from the first participant computing device.

9. The method of claim 1, wherein the transmitting to the second participant computing device step comprises transmitting the payload data to the second participant computing device in response to a request from the second participant computing device.

10. The method of claim 1, wherein the transmitting to the second participant computing device step comprises transmitting the payload data to the second participant computing device in response to a request from the second participant computing device, the request identifying the first participant computing device payload data most-recently stored by the second participant computing device.

11. The method of claim 1, wherein, during the given time period, the payload data is equivalent to the first record more often than the payload data is equivalent to the second record due to the second participant computing device communicating via a connection which permits the second participant computing device to receive more data from the server during the given time period than the third participant computing device.

* * * * *